United States Patent [19]
Chigrinov et al.

[11] Patent Number: 5,389,698
[45] Date of Patent: Feb. 14, 1995

[54] PROCESS FOR MAKING PHOTOPOLYMERS HAVING VARYING MOLECULAR ORIENTATION USING LIGHT TO ORIENT AND POLYMERIZE

[75] Inventors: Vladimir G. Chigrinov, Moscow; Vladimir M. Kozenkov; Nicolic V. Novoseletsky, both of Dolgoprudniy, all of Russian Federation; Victor Y. Reshetnyak; Yuriy A. Reznikov, both of Kiev, Ukraine; Martin Schadt, Seltisberg, Switzerland; Klaus Schmitt, Lörrach, Germany

[73] Assignees: Hoffmann-La Roche Inc., Nutley, N.J.; Niopic Moscow Research and Production Association, Moscow, Russian Federation

[21] Appl. No.: 125,006

[22] Filed: Sep. 21, 1993

Related U.S. Application Data

[63] Continuation of Ser. No. 910,068, Jul. 8, 1992, abandoned.

[30] Foreign Application Priority Data

Jul. 26, 1991 [CH] Switzerland ............... 2244/91

[51] Int. Cl.[6] ............ C08F 2/46; G03C 1/492
[52] U.S. Cl. ............ 522/2; 359/75; 522/150; 430/270; 430/290; 264/1.36; 264/1.38; 204/157.15; 204/157.6; 204/900
[58] Field of Search ............ 359/75, 76, 100, 102, 359/104, 106, 45; 264/1.3, 1.4, 24, 1.1; 428/1; 430/2, 1, 18, 269, 270, 271, 290; 522/2, 150, 149; 204/157.15, 900, 157.6

[56] References Cited

U.S. PATENT DOCUMENTS

| | | | |
|---|---|---|---|
| 4,637,896 | 1/1987 | Shannon | 252/299.7 |
| 4,792,208 | 12/1988 | Ulman et al. | 430/321 |
| 4,822,682 | 4/1989 | Dorsch et al. | 428/411.1 |
| 4,833,035 | 5/1989 | Eidenschink et al. | 428/411.1 |
| 4,857,426 | 8/1989 | Bott et al. | 430/18 |
| 4,974,941 | 12/1990 | Gibbons et al. | 359/45 |
| 5,024,784 | 6/1991 | Eich et al. | 252/299.01 |
| 5,028,107 | 7/1991 | Bierlein et al. | 385/122 |
| 5,032,009 | 7/1991 | Gibbons et al. | 359/76 |
| 5,039,208 | 8/1991 | Ohnishi et al. | 359/100 |
| 5,058,970 | 10/1991 | Schildkaut et al. | 385/3 |
| 5,073,294 | 12/1991 | Shannon et al. | 359/76 |
| 5,075,043 | 12/1991 | Robello et al. | 385/8 |
| 5,098,803 | 3/1992 | Monroe et al. | 430/18 |
| 5,098,975 | 3/1992 | Omelis et al. | 526/312 |
| 5,127,928 | 7/1992 | Farries et al. | 264/1.4 |
| 5,134,053 | 7/1992 | Mueller-Hess et al. | 430/176 |
| 5,290,824 | 3/1994 | Mandel et al. | 522/49 |

FOREIGN PATENT DOCUMENTS

| | | |
|---|---|---|
| 313474 | 9/1988 | European Pat. Off. |
| 410205 | 7/1990 | European Pat. Off. |
| 445629 | 2/1991 | European Pat. Off. |
| 91/03002 | 3/1991 | WIPO |

OTHER PUBLICATIONS

Stumpe, et al., Photoinduced Reorientation and Optical Anisotropy in Films of Photochromic Liquid Crystalline Polymers by Angular-Dependent Photoselection, Freiburg Liquid Crystal Conference (Mar., 1991).
Derwent Abstract 91-058798/09 of PCT Patent Specification WO 91/03002.

*Primary Examiner*—William L. Sikes
*Assistant Examiner*—Kenneth Parker
*Attorney, Agent, or Firm*—Geroge M. Gould; George W. Johnston; John P. Parise

[57] ABSTRACT

An oriented photopolymer is a polymer where photomodification is initiated by irradiation with plane-polarized light and where the molecular configuration has a preferred orientation as a result of linear polarization. These polymers have optically anisotropic and other novel properties.

3 Claims, 1 Drawing Sheet

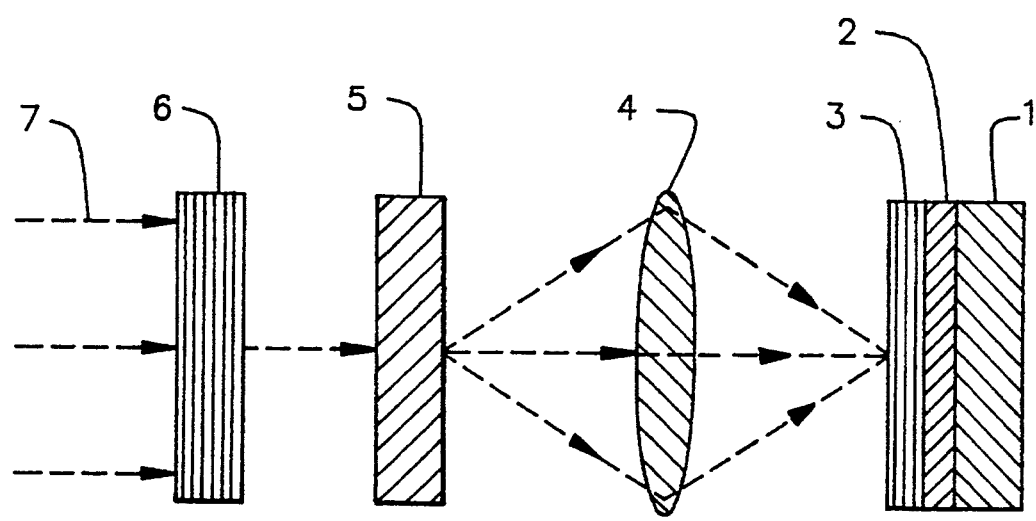

PROCESS FOR MAKING PHOTOPOLYMERS HAVING VARYING MOLECULAR ORIENTATION USING LIGHT TO ORIENT AND POLYMERIZE

This is a continuation of application Ser. No. 07/910,068, filed Jul. 8, 1992, now abandoned.

FIELD OF THE INVENTION

The invention relates to photopolymers with oriented molecular configuration and a process for their manufacture.

BACKGROUND OF THE INVENTION

As is known, photomodification can be brought about by photochemical initiation. This so called photomodification has many applications, e.g. in fiber production, curing of lacquers or production of printing plates. For the purpose of this description, polymers or composition of polymer which are photochemically modified by polarized light will be called "photopolymers".

It is also known that in the so-called stretching of thermoplasties to increase their strength, the molecules in the amorphous regions are given a parallel alignment. The alignment can be fixed, e.g. by cooling, to produce oriented polymers. Other methods of producing oriented polymers are also known, e.g. uniform alignment in an electric field during photomodification, provided the monomer contains an electric dipole. Still another method is to mechanically brush polymers to achieve alignment.

SUMMARY OF THE INVENTION

It has surprisingly been discovered that oriented polymers can also be manufactured if photomodification is brought about by irradiating a photoreactive material with plane-polarized light. For the purpose of this description, the resulting polymers having an oriented molecular configuration are hereinafter called "oriented photopolymers".

In general, different regions of the photoreactive material are irradiated with light polarized in different directions, or some parts of the photoreactive material are irradiated with linearly polarized light whereas other parts are irradiated with non-polarized light. The photopolymer according to the invention contains variously oriented regions or regions with variously oriented and non-oriented molecular structures.

Oriented photopolymers have various applications. One application is the manufacture of orientation layers in liquid crystal cells. See, copending U.S. Pat. application Ser. No. 08/125,005.

Another application relates to the optical anisotropy of the polymer material produced by orientation. Polymer layers manufactured according to the invention can be used as so-called compensation or retarder layers, e.g. in liquid crystal cells or generally in the optical path of rays of liquid crystal cells, so as to eliminate the typical interfering colors in super-twisted nematic cells. This application of the oriented photopolymers is discussed in copending U.S. Pat. application Ser. No. 08/121,093.

BRIEF DESCRIPTION OF THE DRAWING

The drawing is a diagram of a device for performing the method according to the invention.

DETAILED DESCRIPTION OF THE INVENTION

The invention is directed to a process for producing photopolymers having an oriented molecular configuration. In a general sense, a predetermined area of a photoreactive material is irradiated with linearly-polarized light, while another predetermined area is irradiated with non-polarized light, or light polarized in a different plane.

What is meant by "photoreactive material" is an organic monomeric or polymeric material in which photomodification can be induced through photochemical initiation. Photoreactive materials suitable for the invention include, for example, paramethoxycinnamic.

Oriented photomodification can be used to produce transparent polymer layers with a defined optical path difference or retardation $\delta$ $\Delta n \cdot d$, where $\Delta n = (n_e - n_o) =$ the photo-induced optical anisotropy between the ordinary refractive index $n_e$, and d is the thickness of the polymer layer. The optical path difference $\delta$ is determined by the duration and intensity of illumination and also by the layer thickness d and take values in the range between 0 and 400 nm. If the monomer film is illuminated with non-polarized light, $\delta = 0$. Also, the direction of ne can be determined by the direction of oscillation of the linearly-polarized light used for photomodification. The direction of oscillation can be varied in the range from 0° to 180°.

The invention will now be explained in detail with reference to the accompanying drawing and the following Examples. Unless, otherwise indicated, the Examples were carried out as written.

In general, the oriented photopolymer can be prepared with reference to the drawing. A layer 3 of photoreactive organic material is disposed on a substrate (e.g. a glass plate) provided with an electrode layer 2. The layer 3 is illuminated with plane-polarized light through a lens 4, optionally with a mask 5 in front. The light comes from a polarizer 6 illuminated with non-polarized UV light 7. The mask 5 can be replaced by an interferometric imaging process using linearly-polarized light (UV laser).

EXAMPLE 1

A 2% solution of polyvinyl cinnamate (mol. wt. approx. 15,000) in methyl cellosolve acetate was poured on to a glass plate and dried in air for 20 minutes and then at 90° C. on a heating plate. After drying, the layer was not perceptibly double-refracting. The layer then was illuminated at room temperature (about 23° C.) with the light from a mercury vapor lamp through a polarization filter for 2 hours, whereupon double refraction was observable through a microscope. The double refraction, measured in a sweep compensator, was $\Delta n.d = 250$ nm.

EXAMPLE 2

A glass plate was coated with a 2% solution of polyvinyl cinnamate (mol. wt. approx. 15,000) in methyl cellosolve acetate in a spin coating process at 200 rpm and dried as per Example 1. After drying, the layer was not birefringent. It then was illuminated as in Example 1. After illumination the layer had an optical path difference $\Delta n.d = 25$ nm and a refractive index of about 1.6. The layer thickness, measured in an interference microscope, was $d = 455$ nm.

EXAMPLE 3

A glass plate was coated with a 2% solution of polyvinyl cinnamate (mol. wt. approx. 15,000) in methyl cellosolve acetate in a spin coating process at 3,000 rpm for about 30 seconds. The thickness of the resulting layer was about 0.1 $\mu$. The layer was then dried in air for about 20 minutes and then heated to about 80°–90° C. for about 20 seconds. After this pre-treatment, the layer was exposed for about 100 seconds to irradiation with the light of an HgHP lamp at a wavelength $\lambda$ of about 365 nm through a GlanThomson polarizer. The radiation energy was about 15 mW/cm$^2$.

The resulting layer was capable of giving a planar (parallel) orientation to the molecules of an adjacent liquid crystal layer.

EXAMPLE 4

In a procedure analogous to Example 1, a layer of a solution of a polyvinyl ester of paramethoxycinnamic acid (molecular weight approx. 15,000–50,000) in chlorobenzene and dichloro- ethylene 1:1 was exposed for about 10 seconds to irradiation with linearly-polarized light at an intensity of about 0.5 J/cm$^2$.

The resulting layer likewise produced parallel orientation in an adjacent liquid crystal.

EXAMPLE 5

Example 1 was repeated except that illumination was with plane-polarized UV light in two successive stages through masks. In the first illumination stage, only the part of the layer not covered by the mask was photomodified, in the direction determined by the direction of vibration of the electric vector of the linearly-polarized light. In the second illumination stage, the mask was removed and irradiation was with UV light vibrating in a direction which had been changed relative to the first illumination stage. The result, on the glass plate, was an orientation pattern oriented in two different directions.

EXAMPLE 6

Example 5 was repeated but non-polarized light was used in the second illumination stage, resulting in an orientation pattern consisting of oriented and non-oriented regions.

EXAMPLE 7

Example 1 was repeated except that the plane-polarized UV light formed an image through a narrow slot on a slowly rotating glass plate, such that the electric vector of the light vibrated parallel to the longitudinal axis of the slot. The rotation of the plate during the photomodification process resulted in a radially oriented polymer.

What is claimed is:

1. A process for the manufacture of an oriented photopolymer, which comprises:
    a) providing a layer of a photo-polymerizable, optically isotropic polymeric material, and
    b) orienting and polymerizing said layer by irradiating it with linearly-polarized light to obtain the oriented photopolymer.

2. The process according to claim 1, wherein predetermined regions of the polymeric material are irradiated with light polarized in a direction other than that of the linearly-polarized light.

3. The process according to claim 1, wherein a predetermined region of the polymeric material is irradiated with linearly-polarized light, and a different predetermined region is irradiated with non-polarized light.

* * * * *